(12) United States Patent
Poovey

(10) Patent No.: US 7,532,786 B2
(45) Date of Patent: May 12, 2009

(54) LIGHT ACTIVATED OPTICAL SWITCH THAT INCLUDES A PIEZOELECTRIC ELEMENT WITH LAYERS OF PIEZOELECTRIC MATERIAL HAVING DIFFERENT PIEZOELECTRIC CHARACTERISTICS

(76) Inventor: Gary N. Poovey, PMB: 348, 2530 Berryessa Rd., San Jose, CA (US) 95132

( * ) Notice: Subject to any disclaimer, the term of this patent is extended or adjusted under 35 U.S.C. 154(b) by 0 days.

(21) Appl. No.: 11/734,747

(22) Filed: Apr. 12, 2007

(65) Prior Publication Data
US 2008/0226225 A1     Sep. 18, 2008

Related U.S. Application Data

(63) Continuation-in-part of application No. 10/928,769, filed on Aug. 30, 2004, now Pat. No. 7,283,698.

(51) Int. Cl.
*G02B 6/26* (2006.01)
(52) U.S. Cl. .............................. 385/15; 385/16; 385/13; 385/24; 385/14

(58) Field of Classification Search ............ 385/15, 385/16, 17, 18, 24, 49, 42, 12, 13, 14, 132
See application file for complete search history.

(56) References Cited

U.S. PATENT DOCUMENTS

| 6,385,363 | B1 * | 5/2002 | Rajic et al. ................... 385/16 |
| 6,999,221 | B1 * | 2/2006 | Sarkisov et al. ............. 359/244 |
| 7,274,855 | B2 * | 9/2007 | Nevo et al. ................... 385/147 |
| 7,486,848 | B2 * | 2/2009 | Poovey ......................... 385/15 |
| 2005/0129351 | A1 * | 6/2005 | Poovey ......................... 385/16 |
| 2006/0045407 | A1 * | 3/2006 | Poovey ........................... 385/9 |
| 2006/0088268 | A1 * | 4/2006 | Nevo et al. ................... 385/140 |

\* cited by examiner

*Primary Examiner*—Brian M Healy

(57) ABSTRACT

A light activated optical switch has a piezoelectric element that has at least two layers of piezoelectric material with each layer having different piezoelectric characteristics. The piezoelectric characteristics of the layers are selected to enhance the performance of the piezoelectric element and ultimately to enhance the performance of the optical switch.

23 Claims, 12 Drawing Sheets

LIGHT ACTIVATED OPTICAL SWITCH THAT INCLUDES A PIEZOELECTRIC ELEMENT WITH LAYERS OF PIEZOELECTRIC MATERIAL HAVING DIFFERENT PIEZOELECTRIC CHARACTERISTICS

CROSS-REFERENCE TO RELATED APPLICATIONS

This application is a continuation-in-part of application Ser. No. 10/928,769, filed Aug. 30, 2004, now U.S. Pat. No. 7,283,698, dated Oct. 16, 2007 and is related to the U.S. Patent application entitled LIGHT ACTIVATED OPTICAL SWITCH THAT INCLUDES A PIEZOELECTRIC ELEMENT AND A CONDUCTIVE LAYER, Ser. No., 11/734,750 Pending, filed Apr. 12, 2007.

FIELD OF THE INVENTION

The invention relates generally to optical switches and more particularly to a high speed optical switch

BACKGROUND OF THE INVENTION

As technology advances, communication of content-rich media such as three-dimensional drawings, video, and software applications requires more information to be communicated faster than ever. Fiber optical channels can handle much more information than can wires. The slowest part of a fiber optic communication channel at present is the fiber optic switching devices. At present, optical signals are switched using various methods that are activated by solid state transistors, and so are bound by the speed of the solid state transistors, e.g., approximately 10E-9 seconds. U.S. Pat. No. 6,594,411, entitled OPTICAL SWITCH, makes mention of a switch that includes a piezoelectric element. However, the piezoelectric element is activated by a solid-state transistor and therefore is bound by solid state transistor switching speeds.

SUMMARY OF THE INVENTION

An optical switch includes a signal channel and a piezoelectric element that is adjacent to the signal channel. The piezoelectric element changes shape in response to an electrical field that is supplied by an activation light and the piezoelectric element is configured relative to the signal channel such that the change in shape of the piezoelectric element causes a change in a dimension of the signal channel. For example, the change in shape of the piezoelectric element can cause a dimension of the signal channel to be reduced far enough that a signal light is no longer able to pass through the signal channel. Using this phenomenon, the state of the optical switch is controlled by controlling the application of the activation light to the piezoelectric element. In an embodiment, the optical switch allows a signal light to pass through the signal channel when the activation light is not applied to the piezoelectric element and blocks the signal light from passing through the signal channel when the activation light is applied to the piezoelectric element. Because the shape of the piezoelectric element determines whether or not light passes through the signal channel, the function of the optical switch depends on the ability of the piezoelectric element to change shape.

In accordance with an embodiment of the invention, the light activated optical switch has a piezoelectric element that has at least two layers of piezoelectric material with each layer having different piezoelectric characteristics. The piezoelectric characteristics of the layers are selected to enhance the performance of the piezoelectric element and ultimately to enhance the performance of the optical switch.

In accordance with another embodiment of the invention, the light activated optical switch includes at least one conductive layer located adjacent to the piezoelectric element to enhance the electrical field that is applied to the piezoelectric element in response to the activation light. The conductive layer has free electrons or electron holes that collect on a surface adjacent to the piezoelectric element when the activation light is applied to the piezoelectric element. The collection of free electrons near the piezoelectric element enhances the electrical field that is applied to the piezoelectric element in response to the activation light. The enhanced electrical field is used to enhance the performance of the piezoelectric element and ultimately to enhance the performance of the optical switch.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

An optical switch includes a signal channel and a piezoelectric element that is adjacent to the signal channel. The piezoelectric element changes shape in response to an activation light and the piezoelectric element is configured relative to the signal channel such that the change in shape of the piezoelectric element causes a change in a dimension of the signal channel. For example, the change in shape of the piezoelectric element causes a dimension of the signal channel to be reduced far enough that a signal light is no longer able to pass through the signal channel. Using this phenomenon, the state of the optical switch is controlled by controlling the application of the activation light to the piezoelectric element. In an embodiment, the optical switch allows a signal light to pass through the signal channel when the activation light is not applied to the piezoelectric element and blocks the signal light from passing through the signal channel when the activation light is applied to the piezoelectric element. Because the shape of the piezoelectric element determines whether or not light passes through the signal channel, the function of the optical switch depends on the ability of the piezoelectric element to change shape.

In accordance with an embodiment of the invention, the piezoelectric element has at least two layers of piezoelectric material with each layer having different piezoelectric characteristics. The piezoelectric characteristics of the layers are selected to enhance the performance of the piezoelectric element and ultimately to enhance the performance of the optical switch. In an embodiment, the piezoelectric characteristics of the layers are selected to produce a piezoelectric element that exhibits sufficient shape change in response to an activation light to block a signal light from passing through a signal channel.

Figure 1A:
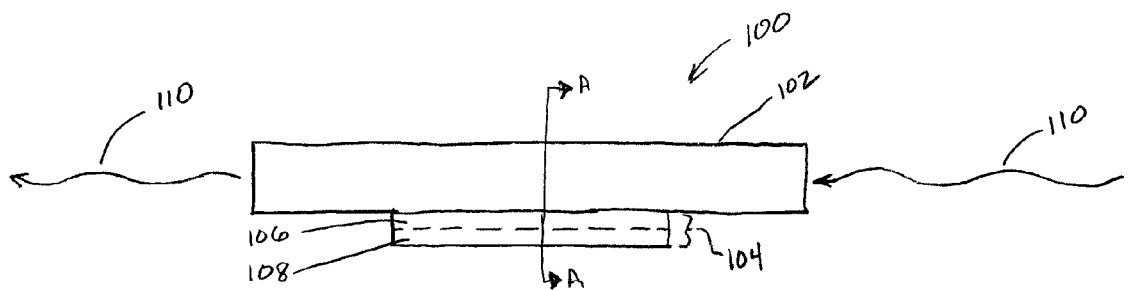
FIG. 1A depicts an optical switch that includes a signal channel and a piezoelectric element and that is controlled by an activation light.

FIG. 1A depicts an optical switch 100 that includes a signal channel 102 and a piezoelectric element 104 and that is controlled by an activation light. The signal channel guides the transmission of light within a confined area along a defined path. The signal channel is formed by a light guiding structure, or combination of structures, which can guide light within a confined area along a defined path. Structures that can form the signal channel include, for example, an optical fiber, substrates such as lithium niobate or other transparent piezoelectric materials that include a signal channel, an optical waveguide, and a chamber for holding a compressible material. In the embodiment of FIG. 1A, the signal channel is formed by a monolithic light guiding element.

The piezoelectric element 104 is formed of piezoelectric material. Examples of piezoelectric material that can be used to form the piezoelectric element include crystalline piezoelectric material such as quartz ($SiO_2$), lithium niobate ($LiNbO_3$), lead zirconate ($PbZrO_3$), lead titanate ($PbTiO_3$), and lead zirconate titanate. Examples of piezoelectric materials that can be oriented in a magnetic field are lead zirconate and lead titanate or lead zicronate titanate. Quartz and lithium niobate are examples of transparent piezoelectric materials.

The piezoelectric element 104 has at least two layers 106 and 108 of piezoelectric material having different piezoelectric characteristics. The different piezoelectric characteristics of the different layers may include, for example: 1) different degrees of expansion and/or shrinkage in response to the same electrical field; 2) different responses to the same electrical field, for example, one of the layers expands in response to an electrical field having a first orientation and the other layer expands in response to an electrical field having a second orientation that is perpendicular to the first orientation; 3) different polarities; 4) different strains; 5) different hysteresis; 6) different capacitances; 7) different impedances; 8) different resistivities; 9) different thermal histories; and 10) different electromagnetic histories.

The piezoelectric characteristics of a piezoelectric material are a function of, for example: 1) the type of piezoelectric material; 2) the crystal orientation of the piezoelectric material; 3) doping levels within the piezoelectric material; 4) the density of the piezoelectric material; 5) the void density of the piezoelectric material; 6) the chemical constituency of the piezoelectric material; 7) the thermal history of the piezoelectric material; 8) the electromagnetic history of the piezoelectric material. The desired piezoelectric characteristic of each layer of piezoelectric material can be achieved by, for example, manipulating one or more of the above-identified parameters.

In an embodiment, layers of piezoelectric material that exhibit different degrees of expansion and/or shrinkage in response to the same electrical field are integrated into a piezoelectric element to cause the piezoelectric element to change shape or bend in response to the activation light. For example, if two adjacent layers of a piezoelectric element, which are adhered to each other into a monolithic element, expand different amounts in response to the same activation light, the piezoelectric element will bend. In an embodiment, the piezoelectric element includes at least two layers of piezoelectric material, having different piezoelectric characteristics, which are formed as a monolithic element. For example, the piezoelectric element is formed by building layers of piezoelectric material on top of each other using semiconductor processing techniques, e.g., crystal growth, deposition, sputtering, ion implantation, etc. In an embodiment, the layers of the piezoelectric element have different crystal orientations so that the two layers respond differently to the same electrical field. For example, the two layers have crystal orientations that are perpendicular to each other. In another embodiment, at least one of the layers of the piezoelectric element is made of an organic material.

Using a piezoelectric element with layers of piezoelectric material having different piezoelectric characteristics, the response of the piezoelectric element can be selected to optimize on/off switching. For example, the piezoelectric characteristics of the layers can be selected to: 1) maximize the shape change of the piezoelectric element in response to the activation light; 2) minimize hysteresis; 3) reduce the amount of power required to change the shape of the piezoelectric element; and 4) reduce the amount of heat generated by the switching technique.

Operation of the optical switch 100 depicted in FIG. 1A is now described with reference to FIGS. 1A and 1B. FIG. 1A illustrates the piezoelectric element 104 in a non-activated state. In the non-activated state, the shape of the piezoelectric element is unchanged from its normal state, where the normal state of the piezoelectric element is the state of the element in the absence of an activation light. In the embodiment of FIG. 1A, the piezoelectric element is basically flat in the non-activated state. The flat shape of the piezoelectric element allows a signal light 110 to pass through the signal channel 104 as indicated by the signal light entering and exiting the signal channel.

Figure 1B:
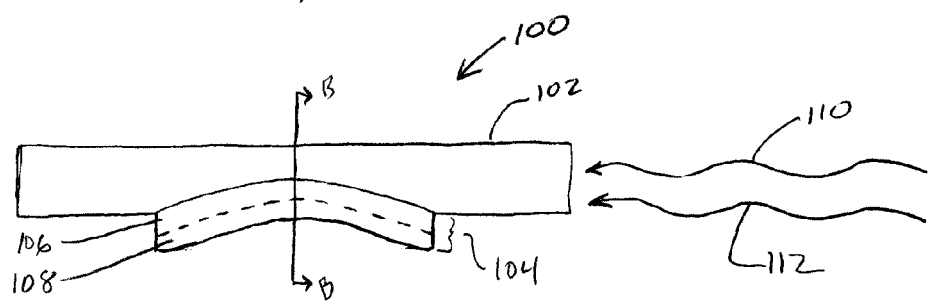
FIG. 1B illustrates the piezoelectric element from FIG. 1A in an activated state that results from the application of an activation light to the piezoelectric element.

FIG. 1B illustrates the piezoelectric element 104 in an activated state that results from the application of an activation light 112 to the piezoelectric element. In the embodiment of FIG. 1B, the activation light is applied to the piezoelectric element by directing the activation light into the signal channel 102 in parallel with the signal light 110. The activation light supplies an electrical field that effects the piezoelectric material. In the activated state, the shape of the piezoelectric element changes shape enough that the signal light is blocked from passing through the signal channel. The blocking of the signal light is indicated by the lack of the signal light exiting the signal channel. Once the activation light is removed from the signal channel, the piezoelectric element returns to its normal shape and the signal light is able once again to pass through the signal channel.

Figure 2A:
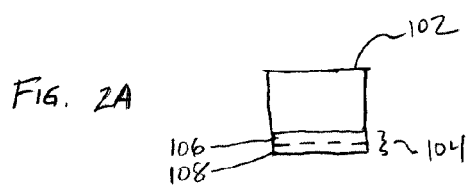
FIG. 2A depicts a cross-sectional view AA of the signal channel and the piezoelectric element from FIG. 1A when the piezoelectric element is in a non-activated state.
Figure 2B:
FIG. 2B depicts a cross-sectional view BB of the signal channel and the piezoelectric element from FIG. 1B when the piezoelectric element is in an activated state.

As described above, activation of the piezoelectric element 104 in response to the activation light 112 causes the shape of the piezoelectric element to change, thereby causing at least one dimension of the signal channel 102 to change. FIG. 2A depicts a cross-sectional view AA of the signal channel and the piezoelectric element from FIG. 1A when the piezoelectric element is in a non-activated state. FIG. 2B depicts a cross-sectional view BB of the signal channel and the piezoelectric element from FIG. 1B when the piezoelectric element is in an activated state. In the activated state, the piezoelectric element extends into the signal channel and reduces at least one dimension of the signal channel. As illustrated in FIGS. 2A and 2B, the cross-sectional area of the signal channel is smaller in the activated state (FIG. 2B) than it is in the non-activated state (FIG. 2A).

In the embodiment of FIGS. 1A-2B, there is still an opening in the signal channel 102 even when the piezoelectric element 104 is in the activated state. Although there is still an opening in the signal channel even when the piezoelectric element is in the activated state, the opening in the signal channel is small enough that the signal light 110 is blocked from passing through the signal channel. The ability of a signal light to pass through the signal channel is a function of the dimensions of the signal channel and of the wavelength of the signal channel. In general, light having a shorter wavelength is able to pass through a signal channel with a smaller dimension than light having a longer wavelength.

Figure 3:
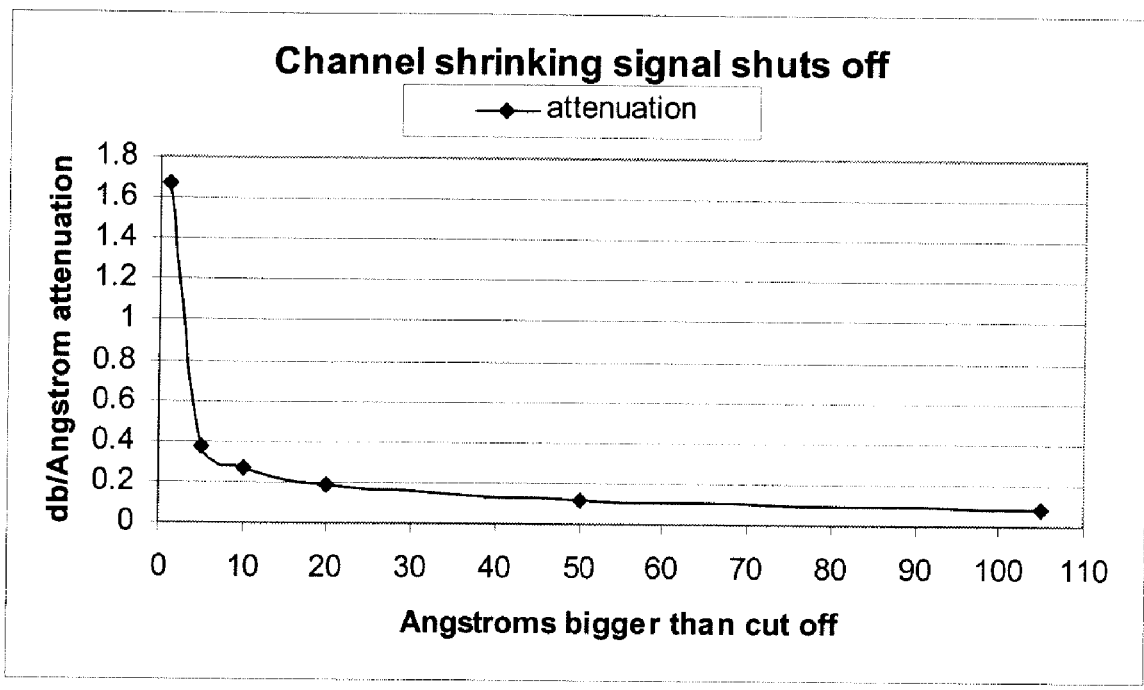
FIG. 3 depicts a graph of optical signal attenuation vs. a dimension of a signal channel.

FIG. 3 depicts a graph of optical signal attenuation vs. a dimension of a signal channel. As illustrated in FIG. 3, the optical signal attenuation changes rapidly once the signal channel dimension reaches a certain dimension, referred to herein as the cutoff dimension. For example, at a dimension smaller than the cutoff dimension (e.g., about 5 angstroms), the attenuation rapidly rises and at a dimension larger than the cutoff dimension, the attenuation rapidly falls. The sharp response to a change in the signal channel dimension around the cutoff dimension as indicated in FIG. 3 enables fast on/off switching by toggling the activation light such that a dimension of the signal channel switches between being larger or smaller than the cutoff dimension.

As described above, the state of the optical switch 100 is activated by applying an activation light 112 to the piezoelectric element 104. Activation light can be applied to the piezoelectric element using different techniques. Some exemplary techniques for applying activation light to the piezoelectric element are described with reference to FIGS. 4A-5B.

Figure 4A:
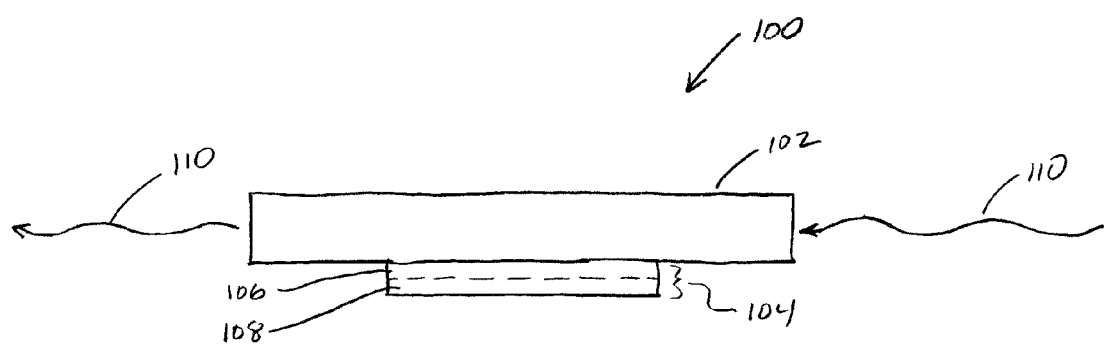
FIGS. 4A and 4B illustrate a technique for changing the state of an optical switch that involves applying an activation light having a shorter wavelength than the signal light.
Figure 4B:
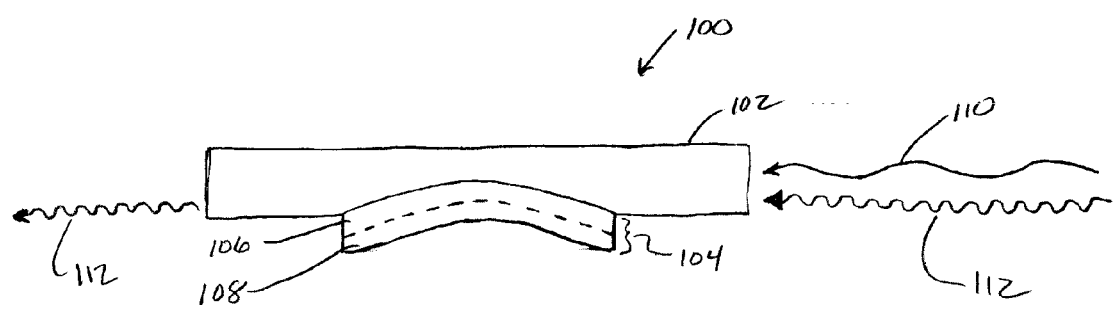

FIGS. 4A and 4B illustrate a technique for changing the state of an optical switch 110 that involves applying an activation light having a shorter wavelength than the signal light. Referring to FIG. 4A, the optical switch is in an on state when no activation light is applied to the piezoelectric element 104 and the signal light 110 passes through the signal channel 102. As illustrated in FIG. 4B, activation light 112 is applied to the piezoelectric element to change the state of the optical switch from on to off. In the off state, the activation light causes the piezoelectric element to change shape and block the passage of the signal light through the signal channel. In this example, the activation light has a shorter wavelength than the signal light. In particular, the wavelength of the activation light is short enough that the activation light is still able to pass through the signal channel even when the optical switch is in an off state. FIG. 4B illustrates the case in which the activation light, which has a shorter wavelength than the signal light, is able to pass through the signal channel even when the optical switch is in the off state.

Figure 5A:
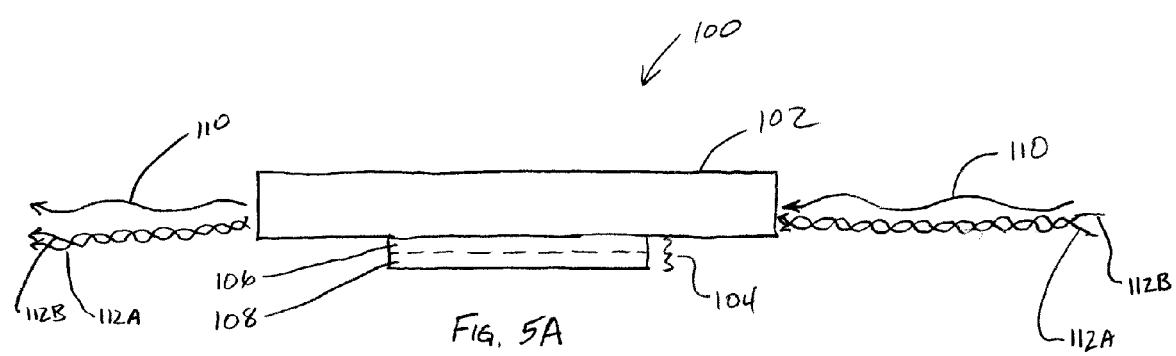
FIGS. 5A and 5B illustrate a technique for changing the state of an optical switch in which applying the activation light involves providing two light signals, which are out of phase with each other, to the piezoelectric element and then removing one of the light signals, leaving the remaining light signal as the activation light.
Figure 5B:
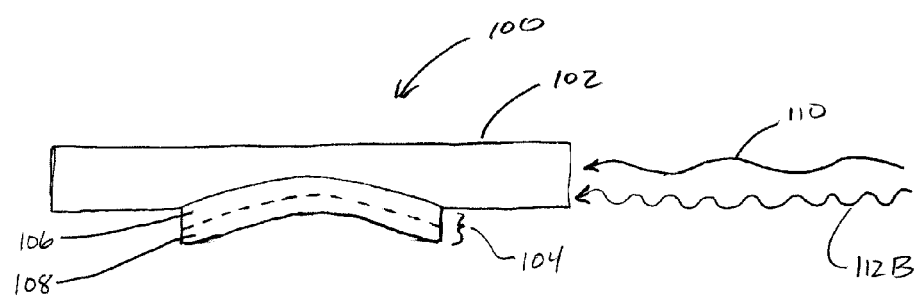

FIGS. 5A and 5B illustrate a technique for changing the state of an optical switch 100 in which applying the activation light involves providing two light signals 112A and 112B, which are out of phase with each other, to the piezoelectric element 104 and then removing one of the light signals, leaving the remaining light signal as the activation light. In this embodiment, the two signals are out of phase with each other such that their electrical fields effectively cancel each other out (e.g., 180 degrees out of phase). Because the two out of phase signals cancel each other out, while the two out of phase signals are simultaneously applied to the piezoelectric element, the piezoelectric element is not activated. Once one of the light signals is removed, the electrical field of the remaining light signal is no longer canceled out and the remaining light signal activates the piezoelectric element. FIG. 5A illustrates the signal light 110 and both components of the out of phase light signals 112A and 112B passing through the signal channel 102. As described above, the piezoelectric element is not activated in this case because the two out of phase light signals cancel each other out. In FIG. 5B, one of the out of phase light signals 112A is removed, leaving the remaining light signal 112B as the activation light.

The activation light activates the piezoelectric element 104 and blocks the passage of the signal light (and the activation light in this case) through the signal channel. In another embodiment, the power of one of the two light signals can be increased above the other light signal to overcome the canceling effect thereby providing the activation light.

Another technique for optimizing the performance of a light activated optical switch is to enhance the electrical field that is applied to the piezoelectric element in response to the activation light. In accordance with an embodiment of the invention, at least one conductive layer is located adjacent to the piezoelectric element of a light activated optical switch to enhance the electrical field that is applied to the piezoelectric element in response to the activation light. The conductive layer has free electrons or electron holes that are drawn to and collect at a surface adjacent to the piezoelectric element when the activation light is applied to the piezoelectric element. The collection of free electrons near the piezoelectric element enhances the electrical field that is applied to the piezoelectric element in response to the activation light. The enhanced electrical field can be used to enhance the performance of the piezoelectric element and ultimately to enhance the performance of the optical switch. For example, the enhanced electrical field contributed from the adjacent conductive layer enables the piezoelectric element to be activated with lower power and/or quicker than is possible when there is not a conductive layer adjacent to the piezoelectric element.

Without the conductive layer the electric field of the activation light alone activates the piezoelectric element. When a conductive layer is used, the conductive layer supplies charges that are gathered or dispersed by the electric field of the activation light. The electric field of the gathered charges adds to the electric field of the activation light. In this case, the piezoelectric element is acted upon by the electric field of the activation light and the electric field of the gathered charges. In the case of dispersed charges, matter is composed of positive and negative charges so when one is dispersed the other is expressed. In this case the electric field of the expressed charges adds to the electric field of the activation light and the effect on the piezoelectric element is enhanced. Electrons move in metal conductors, but positive holes can move in a semiconductor.

Figure 6A:
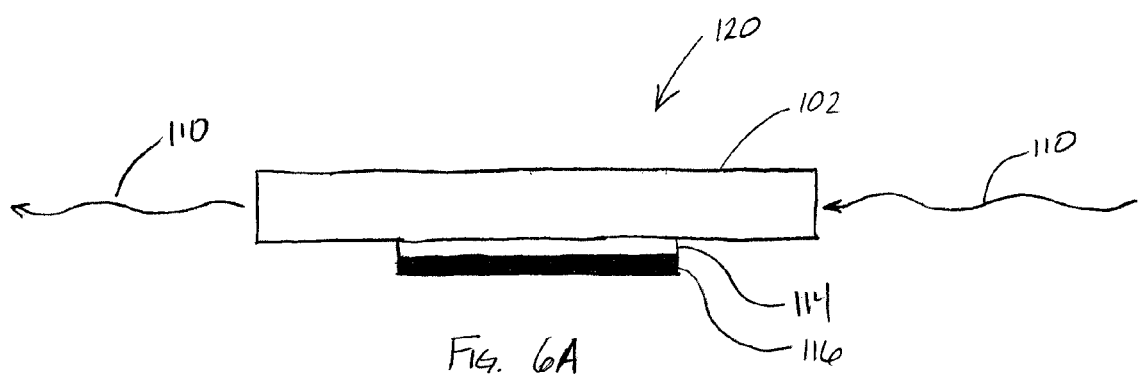
FIG. 6A depicts an embodiment of a light activated optical switch that includes a signal channel, a piezoelectric element, and a conductive layer adjacent to the piezoelectric element.

FIG. 6A depicts an embodiment of a light activated optical switch 120 that includes a signal channel 102, a piezoelectric element 114, and a conductive layer 116 adjacent to the piezoelectric element. The signal channel and piezoelectric element are similar to those described above, although the piezoelectric element does not necessarily include different layers of piezoelectric material having different piezoelectric characteristics. The conductive layer is a highly conductive material such as lead, tungsten, other metals, silicon doped with boron, silicon doped with boron, silicon doped with arsenic, doped gallium arsenide, and/or other semiconductor materials. In an embodiment, the conductive layer is adhered to a surface of the piezoelectric element. For example, the conductive layer may be deposited on a major surface of the piezoelectric element using a metal deposition technique. In an alternative embodiment, the conductive material is a semiconductor material with positive or negative charges that move instead of only negative charges.

Operation of the optical switch 120 depicted in FIG. 6A is now described with reference to FIGS. 6A and 6B. FIG. 6A illustrates the piezoelectric element 114 in a non-activated state. In the non-activated state, the shape of the piezoelectric element is unchanged from its normal state, where the normal state of the piezoelectric element is the state of the element in the absence of an activation light. In the embodiment of FIG. 6A, the piezoelectric element is basically flat in the non-activated state. The flat shape of the piezoelectric element allows a signal light 110 to pass through the signal channel as indicated by the signal light entering and exiting the signal channel.

Figure 6B:
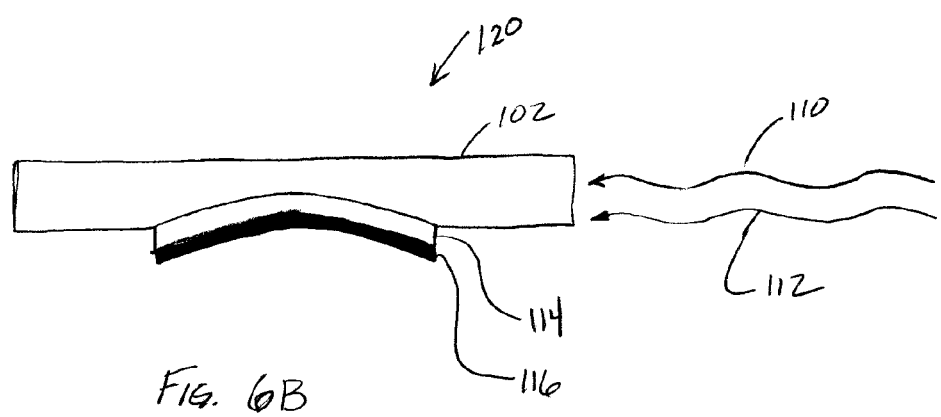
FIG. 6B illustrates the piezoelectric element from FIG. 6A in an activated state that results from the application of an activation light to the piezoelectric element.

FIG. 6B illustrates the piezoelectric element 114 in an activated state that results from the application of an activation light 112 to the piezoelectric element. In the embodiment of FIG. 6B, the activation light is applied to the piezoelectric element by directing the activation light into the signal channel 102 in parallel with the signal light 110. When the activation light is applied to the piezoelectric element, free electrons are drawn to the surface of the conductive layer 116 that is nearest the piezoelectric element 114. In the activated state, the shape of the piezoelectric element changes shape enough that the signal light is blocked from passing through the signal channel. The blocking of the signal light is indicated by the lack of the signal light exiting the signal channel. The additional electrons near the piezoelectric material, which are associated with the conductive layer, cause an increase in the electric field that is applied to the piezoelectric material. The increase in the electrical field that is associated with the conductive layer provides benefits that include, for example, increasing the magnitude of the change in shape of the piezoelectric element, increasing the speed at which the piezoelectric element changes shape, and/or reducing the amount of activation light required to achieve the desired shape change.

Figure 7:
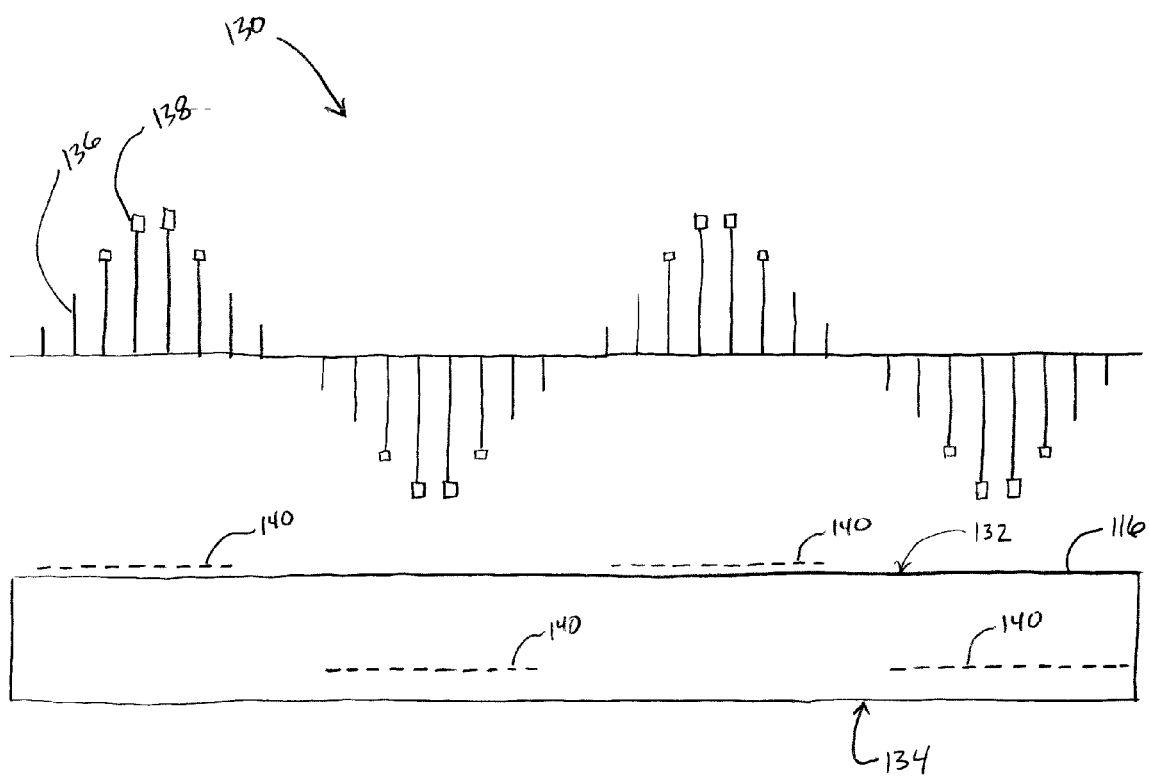
FIG. 7 illustrates the action of an electrical field of the light on the electrons of a conductive layer.

FIG. 7 illustrates the action of an electrical field 130 of the activation light 112 on the electrons of a conductive layer 116. In FIG. 7, surface 132 is the surface of the conductive layer nearest the activation light 110 and the surface 134 is the surface of the conductive layer farthest from the activation light. The comb-like structure in FIG. 7 represents the electrical field under the influence of the conductive layer. Each tooth 136 of the comb-like structure represents a portion of the electrical field and some of the teeth have wide extensions 138 at their ends. These wide extensions represent the larger field that is contributed by the charges that move in the conductive layer that is adjacent to the piezoelectric element. The charges that move in response to the electric field of the activation light are represented by dashed lines 140. When the electric field is negative the charges in the conductive layer are driven away from the near surface of the conductive layer and enhance the negative field. When the electric field is positive the charges in the conductive layer come to the near surface of the conductive layer and enhance the electric field. If the conductive layer is not present, no charges would move because piezoelectric materials are not conductors but dielectric materials. Referring to FIG. 7, if the conductive layer 116 was removed leaving only a piezoelectric element (not shown), the teeth 136 on the comb like structure would have no extensions 138 on them.

Figure 8:
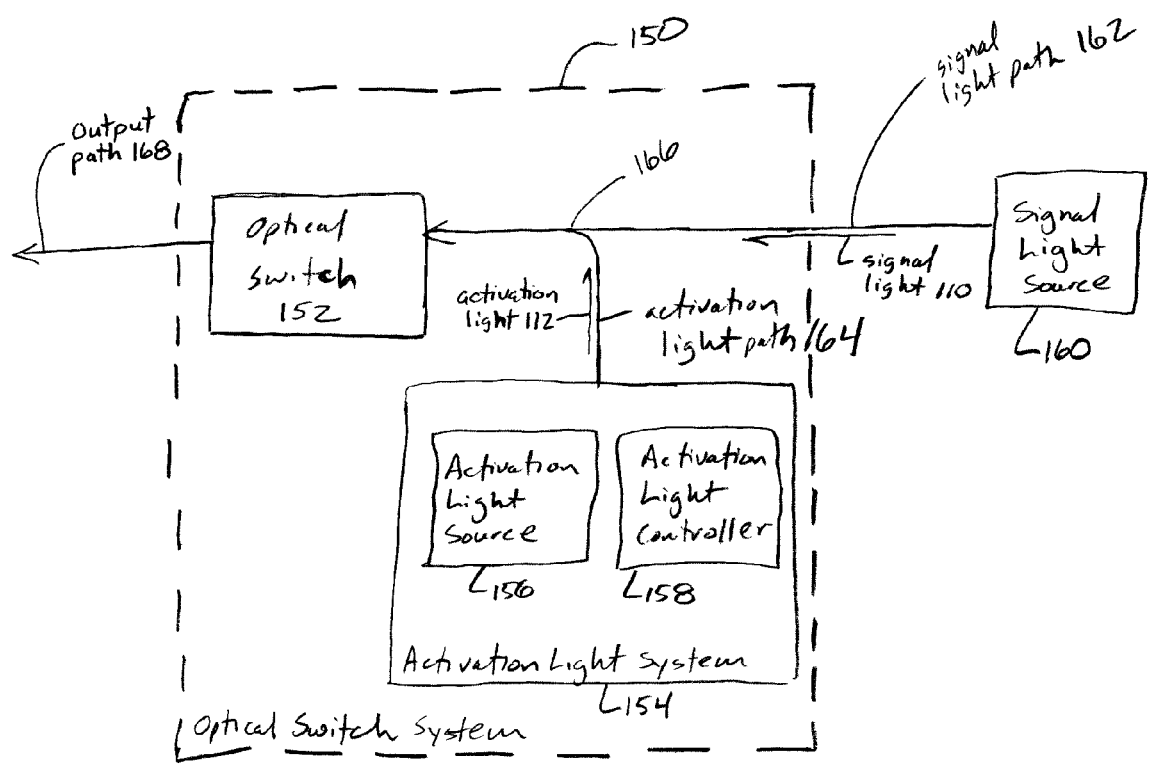
FIG. 8 depicts an optical switch system that includes a light activated optical switch as described above with reference to FIGS. 1A-7.

FIG. 8 depicts an optical switch system 150 that includes a light activated optical switch 152 as described above with reference to FIGS. 1A-7. The optical switch system of FIG. 8 also includes an activation light system 154, which includes an activation light source 156 and an activation light controller 158. The optical switch system is optically connected to a signal light source 160 to receive a signal light. In the embodiment of FIG. 8, the signal light is provided to the optical switch via a signal light path 162 and the activation light is provided to the optical switch via an activation light path 164 and the signal light path. The signal light and activation light are combined at a coupler 166. The output of the optical switch goes through an output path 168.

The activation light system 154 controls the application of activation light 112 to the piezoelectric element of the optical switch 152. In the embodiment of FIG. 8, the activation light source 156 is a light source such as a light emitting diode (LED) or a laser that generates an activation light with the desired characteristics, e.g., the desired wavelength, intensity, phase of the activation light in relation to the other light in the signal channel, and polarization, and the activation light controller 158 controls the transmission of the activation light from the activation light system. In an embodiment, the intensity of the activation light must be great enough to sufficiently change the shape of the piezoelectric element of the optical switch and in an embodiment, the intensity of the activation light is greater than the intensity of the signal light. The wavelength of the activation light can be shorter or longer than the wavelength of the signal light. As described above, if the wavelength of the activation light is short enough, the activation light may pass through the signal channel even when the piezoelectric element is activated and the signal light is blocked.

The activation light system 154 can be configured to provide the activation light 112 to the optical switch 152 in many different ways. For example, in one embodiment, the activation light is switched on and off by a second light activated optical switch, in another embodiment the angle of a mirror is changed to provide the activation light, in another embodiment, an LED or laser is turned on/off, and in other embodiments, other switches may be employed to control the activation light. The signal light source 156 generates the signal light 110 that is switched on and off by the optical switch (i.e., allowed to pass through the optical switch and blocked from passing through the optical switch). In an embodiment, the signal light source is an optical transmitter that transmits digital data by modulating an optical signal (e.g., frequency or amplitude modulation). In an embodiment, the signal light that is output by the signal light source is an optical signal that communicates digital data in some way (e.g., amplitude or frequency modulation, logic, etc.) while the activation light that is output by the activation light source does not communicate digital data. For example, the signal light may carry digital data in a modulated light format while the activation light is not modulated to carry digital data.

In operation, the signal light 110 is provided to the optical switch 152 via the signal light source 160 and the application of the activation light 112 to the piezoelectric element of the optical switch is controlled by the activation light system 154. In one embodiment, the signal light passes through the optical switch when the activation light system does not provide an activation light to the optical switch and is blocked from passing through the optical switch when the activation light system does provide an activation light to the optical switch.

Figure 9:
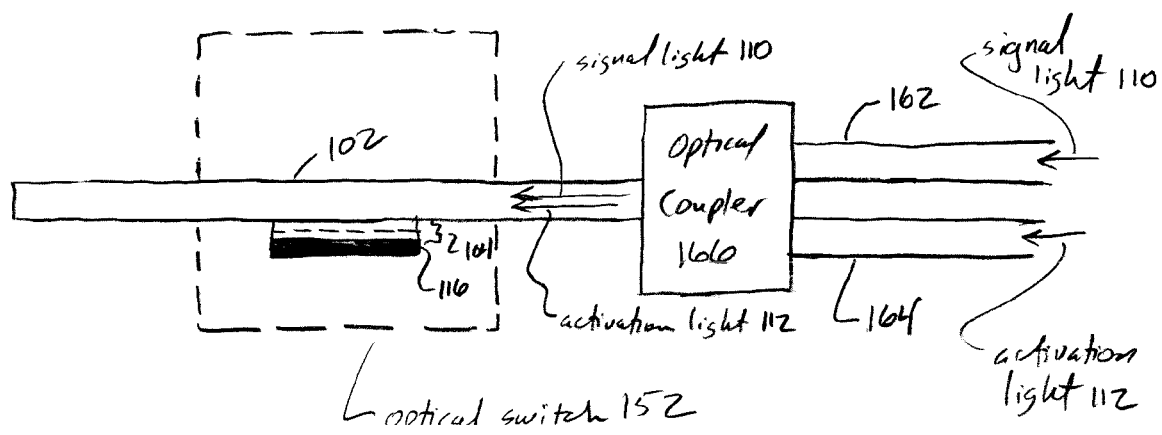
FIG. 9 depicts an embodiment of an optical switch and an optical coupler that is used to couple the signal light and the activation light into the same signal channel.

In the optical switches described with reference to FIGS. 1A-6B, the signal light and activation light are transmitted in the same signal channel. Various techniques can be used to combine the signal light and the activation light into the same signal channel. FIG. 9 depicts an embodiment of an optical switch 152 and an optical coupler 166 that is used to couple the signal light 110 and the activation light 112 into the same signal channel 102. In the embodiment of FIG. 9, the signal light travels in a signal fiber 162 and the activation light travels in an activation fiber 164. The signal light and activation light are coupled into the signal channel by the optical coupler. Although an optical coupler is depicted in FIG. 9, other techniques for coupling the signal light and the activation light into the same signal channel can be used.

Figure 10A:
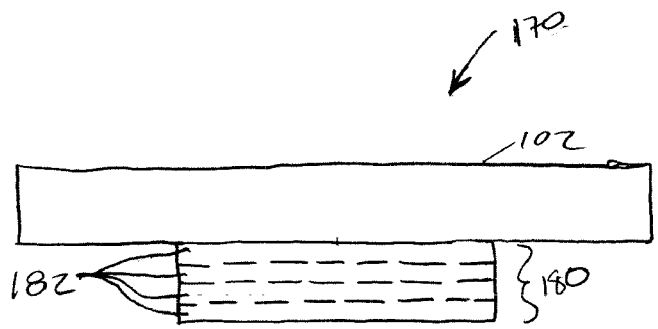
FIG. 10A depicts an embodiment of a piezoelectric element that has more than two layers of piezoelectric material with different piezoelectric characteristics.

FIGS. 10A-10E depict different embodiments of the light activated optical switches described above with reference to FIGS. 1A-9. FIG. 10A depicts an embodiment of a light activated optical switch 170 in which the piezoelectric element 180 has more than two layers 182 of piezoelectric material with different piezoelectric characteristics. In the embodiment of FIG. 10, the piezoelectric element has four layers of piezoelectric material. In one embodiment, the different layers of piezoelectric material each have a different piezoelectric characteristic an in another embodiment, the different layers of piezoelectric material have alternating piezoelectric characteristics. It should be understood that the number and arrangement of piezoelectric layers can include many different variations.

Figure 10B:
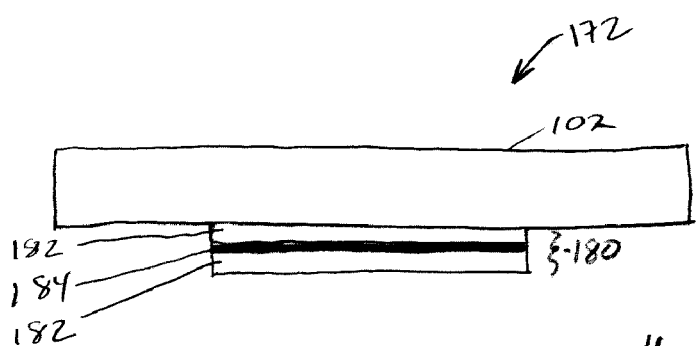
FIG. 10B depicts an embodiment of a light activated optical switch that includes a conductive layer sandwiched between two layers of a piezoelectric element.

FIG. 10B depicts an embodiment of a light activated optical switch 172 in which a conductive layer 184 is sandwiched between two layers 182 of the piezoelectric element 180. This embodiment allows the piezoelectric element to be oriented by placing charges on the conductive layer and causes the change in shape of each layer of the piezoelectric element to be enhanced because of the proximity of the piezoelectric layers to the conductive layer.

Figure 10C:
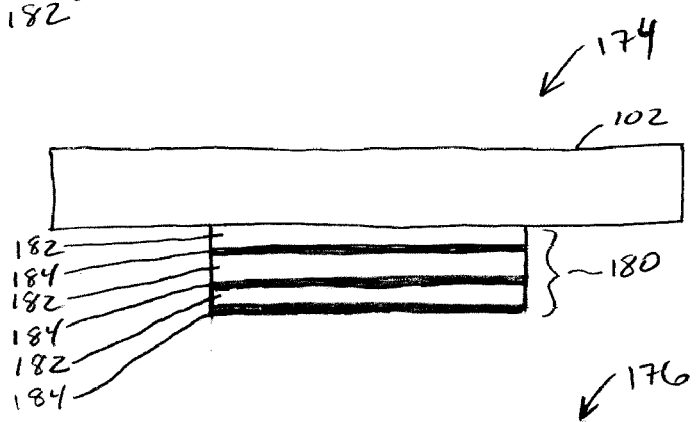
FIG. 10C depicts an embodiment of a light activated optical switch that includes multiple conductive layers sandwiched between a multilayer piezoelectric element.

FIG. 10C depicts an embodiment of a light activated optical switch 174 in which multiple conductive layers 184 are sandwiched between multiple different layers 182 of the piezoelectric element 180. In this example, the conductive layers are alternately adhered between different layers of the piezoelectric element. The multiple layers of conductive material between the piezoelectric layers allow each layer of piezoelectric material to be polarized individually to different orientations by applying a charge to the conductive layers. This enables the action of the piezoelectric layers working against each other to accentuate the change in shape of the piezoelectric element.

In general, the multiple conductive layers allow the hysteresis of the piezoelectric element to be managed. The multiple conductive layers allow a reduction in the temperature that the piezoelectric element must be raised to in order to change the orientation of the piezoelectric material. The multiple conductive layers allow the change in shape of the piezoelectric element to be enhanced. The multiple conductive layers allow the management of many mechanical, electrical, thermal, and other physical characteristics of the optical switch to be managed to make the optical switch easier to be constructed, maintained, and used. In an embodiment, the different layers of piezoelectric material and the conductive layers are formed in a monolithic stack structure. The monolithic stack structure can be formed, for example, using known semiconductor processing techniques, e.g., crystal growth, metal deposition, sputtering, ion implantation, etc.

In some cases, the hysteresis of a piezoelectric element can limit how quickly a light activated optical switch, which is made with a piezoelectric element, can be changed from one state to another. In an embodiment, a 3000 angstroms thick layer of lead zirconate titanate (PZT) is deposited on a substrate. The layer of PZT has a given percentage of lead and a given percentage of zirconium and titanium. Next, a 3000 angstrom layer of PZT is deposited on the first layer, with this layer having more lead and zirconium while reducing the percentage of titanium on top of that. Using these layers, the hysteresis that the resulting piezoelectric element displays is reduced in comparison to a piezoelectric element that does not include similar layers. If more alternating layers are deposited to build up a piezoelectric element, a quickly responding piezoelectric element can be fabricated. If all of this is deposited upon a conductive layer, the electric field of the activation light is enhanced to make a light activated optical switch that responds even faster.

Figure 10D:
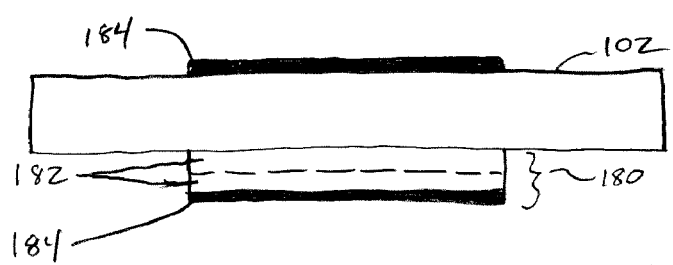
FIG. 10D depicts an embodiment of a light activated optical switch that includes a multilayer piezoelectric element and conductive layer on two sides of the signal channel.

FIG. 10D depicts an embodiment of a light activated optical switch 176 that includes a multilayer piezoelectric element 180 on one side of the signal channel 102 and conductive layers 184 on two sides of the signal channel. The response of the switch is enhanced by a multiplicity of conductive layers.

Figure 10E:
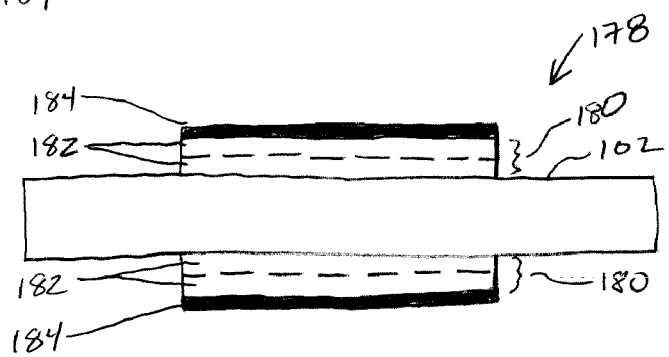
FIG. 10E depicts an embodiment of a light activated optical switch that includes a multilayer piezoelectric element and a conductive layers on two sides of the signal channel.

FIG. 10E depicts an embodiment of a light activated optical switch 178 that includes a multilayer piezoelectric element 180 and a conductive layer 184 on two sides of the signal channel 102. In an embodiment, FIG. 10E represents a cross-sectional view of an optical fiber that includes a piezoelectric element and a conductive layer formed in a band entirely around the circumference of the optical fiber. In this embodiment, the fiber is a compressible material.

Figure 11A:
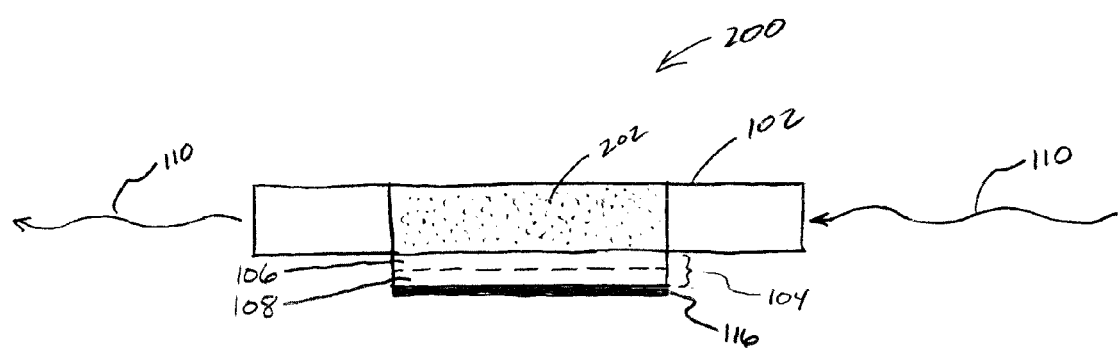
FIG. 11A depicts an embodiment of a light activated optical switch that includes a signal channel and a piezoelectric element, where a portion of the signal channel includes a chamber that is filled with a compressible material.

FIG. 11A depicts an embodiment of a light activated optical switch 200 that includes a signal channel 102, a piezoelectric element 104, and a conductive layer 116, where a portion of the signal channel includes a chamber 202 that is filled with a compressible material. The compressible material may be, for example, a gas such as argon or nitrogen or a material such as a petroleum distillate or a silicon rubber. The chamber filled with the compressible material is adjacent to the piezoelectric element 104 such that the piezoelectric element can expand into the chamber when activated by the activation light. In an embodiment, the piezoelectric element forms a portion of the chamber. In an embodiment, at least a portion of the chamber is formed by a transparent material.

Operation of the optical switch 200 depicted in FIG. 11A is now described with reference to FIGS. 11A and 11B. FIG. 11A illustrates the piezoelectric element 104 in a non-activated state. In the non-activated state, the shape of the piezoelectric element is unchanged from its normal state, where the normal state of the piezoelectric element is the state of the element in the absence of an activation light. In the embodiment of FIG. 11A, the piezoelectric element is basically flat in the non-activated state and does not protrude into the chamber 202. The flat shape of the piezoelectric element allows a signal light 110 to pass through the signal channel 102 (including the chamber) as indicated by the signal light entering and exiting the signal channel.

Figure 11B:
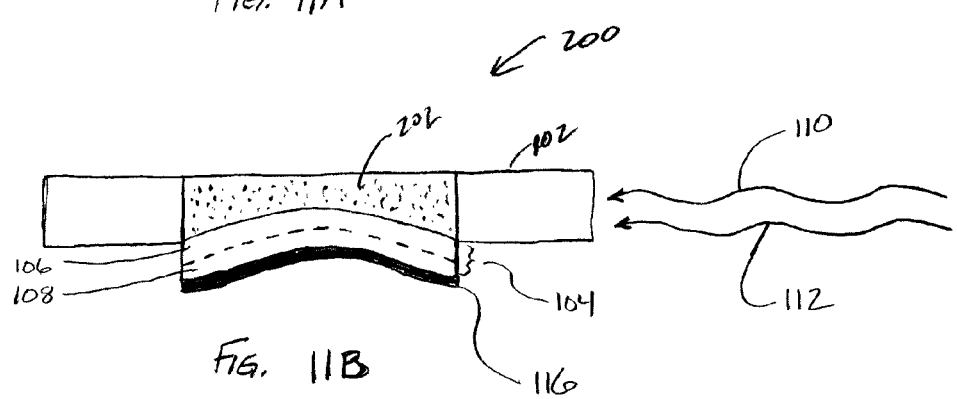
FIG. 11B illustrates the piezoelectric element from FIG. 11A in an activated state that results from the application of an activation light to the piezoelectric element.

FIG. 11B illustrates the piezoelectric element 104 in an activated state that results from the application of an activation light 112 to the piezoelectric element. In the embodiment of FIG. 11B, the activation light is applied to the piezoelectric element by directing the activation light into the signal channel 102 in parallel with the signal light 110. When the activation light is applied to the piezoelectric element, the piezoelectric element protrudes into the chamber 202, thereby compressing the compressible material within the chamber. In the activated state, the shape of the piezoelectric element changes enough that the signal light is blocked from passing through the signal channel. The blocking of the signal light is indicated by the lack of the signal light exiting the signal channel. When the activation light is removed from the signal channel, the piezoelectric element returns to its normal state allowing the signal light to pass. In the absence of the activation light, the pressure of the compressed material within the chamber helps to return the piezoelectric element to its normal state.

Figure 12A:
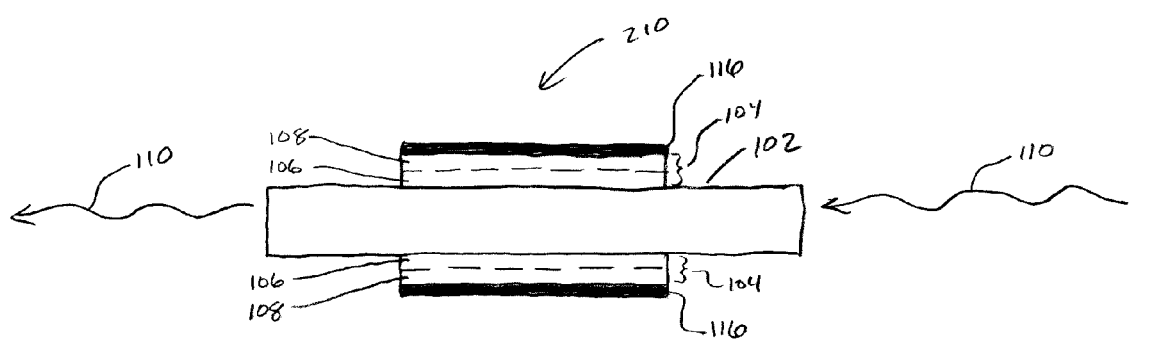
FIG. 12A depicts an embodiment of a light activated optical switch that includes a signal channel, a piezoelectric element, and a conductive layer adjacent to the piezoelectric element in which the signal channel is an optical fiber and the piezoelectric element and conductive layer are formed in a band entirely around the circumference of the optical fiber.
Figure 12B:
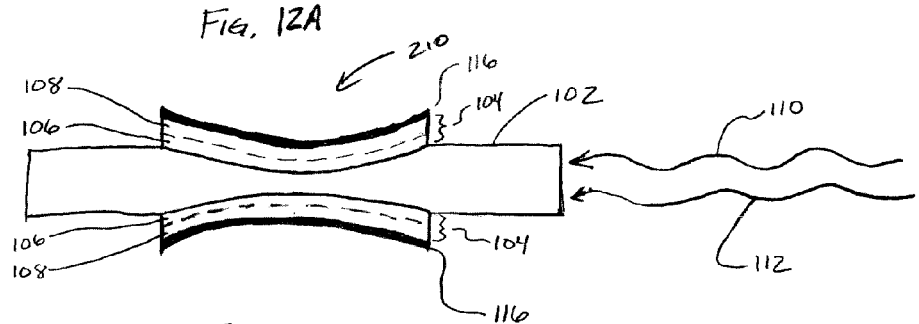
FIG. 12B illustrates the piezoelectric element from FIG. 12A in an activated state that results from the application of an activation light to the piezoelectric element.

FIG. 12A depicts an embodiment of a light activated optical switch 210 that includes a signal channel 102, a piezoelectric element 104, and a conductive layer 116 adjacent to the piezoelectric element in which the signal channel is an optical fiber and the piezoelectric element and conductive layer are formed in a band entirely around the circumference of the optical fiber. FIG. 12A illustrates the piezoelectric element in a non-activated state. In the non-activated state, the shape of the piezoelectric element is unchanged from its normal state, where the normal state of the piezoelectric element is the state of the element in the absence of an activation light. In the embodiment of FIG. 12A, the piezoelectric element is basically flat in the non-activated state. The flat shape of the piezoelectric element allows a signal light 110 to pass through the signal channel as indicated by the signal light entering and exiting the signal channel. FIG. 12B illustrates the piezoelectric element in an activated state that results from the application of an activation light 112 to the piezoelectric element. In the embodiment of FIG. 12B, the activation light is applied to the piezoelectric element by directing the activation light into the signal channel in parallel with the signal light. In the activated state, the shape of the piezoelectric element changes enough that the signal light is blocked from passing through the signal channel. For example, the change in shape of the piezoelectric element has the effect of squeezing the optical fiber like a belt to choke the passage of the signal light. The blocking of the signal light is indicated by the lack of the signal light exiting the signal channel. Once the activation light is removed from the signal channel, the piezoelectric element returns to its normal shape and the signal light is able once again to pass through the signal channel.

Figure 13A:
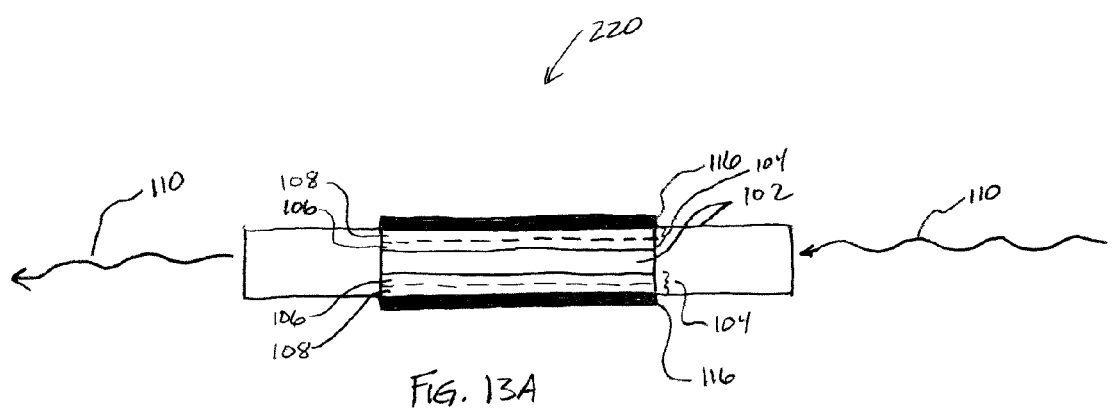
FIG. 13A depicts an embodiment of a light activated optical switch that includes a signal channel, a transparent piezoelectric element, and a conductive layer adjacent to the piezoelectric element in which the signal channel includes the transparent piezoelectric element.
Figure 13B:
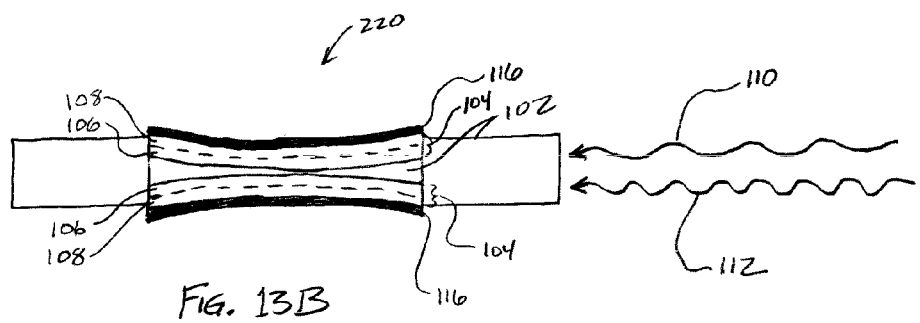
FIG. 13B illustrates the piezoelectric element from FIG. 13A in an activated state that results from the application of an activation light to the piezoelectric element.

FIG. 13A depicts an embodiment of a light activated optical switch 220 that includes a signal channel 102, a piezoelectric element 104, and a conductive layer 116 adjacent to the piezoelectric element in which the piezoelectric element is made of a transparent material and forms at least a portion of the signal channel. FIG. 13A illustrates the piezoelectric element in a non-activated state. In the non-activated state, the shape of the piezoelectric element is unchanged from its normal state, where the normal state of the piezoelectric element is the state of the element in the absence of an activation light. In the embodiment of FIG. 13A, the piezoelectric element is basically flat in the non-activated state. The flat shape of the piezoelectric element allows a signal light 110 to pass through the signal channel as indicated by the signal light entering and exiting the signal channel. FIG. 13B illustrates the piezoelectric element in an activated state that results from the application of an activation light 112 to the piezoelectric element. In the embodiment of FIG. 13B, the activation light is applied to the piezoelectric element by directing the activation light into the signal channel in parallel with the signal light. In the activated state, the shape of the piezoelectric element changes enough that the signal light is blocked from passing through the signal channel. For example, the change in shape of the piezoelectric element has the effect of squeezing the signal channel like a belt to choke the passage of the signal light. The blocking of the signal light is indicated by the lack of the signal light exiting the signal channel. Once the activation light is removed from the signal channel, the piezoelectric element returns to its normal shape and the signal light is able once again to pass through the signal channel.

In an embodiment, the piezoelectric element and the signal channel are configured relative to each other such that application of the activation light changes the state of the optical switch from off (light is blocked) to on (light passes through the signal channel) instead of from on to off.

Some piezoelectric materials have a crystal orientation that must be aligned with the electric field that will cause it to change shape. Other piezoelectric materials can be heated up in a magnetic field and oriented to respond in the desired direction to the electric field that will be applied. In constructing a light activated optical switch, the orientation of the crystal or the magnetic orientation of the piezoelectric material should be directed to have the maximum shape change at right angles (that is perpendicular) to the direction of the signal light in the signal channel. In an embodiment, the electric field that triggers the switching is at right angles (that is perpendicular) to the path of the light in the light channel. A description of a desired interaction follows. The electric field in volts needed to activate a light activated optical switch is calculated using the power in watts of the light in the channel. The Poynting vector equation which is written $E=(2\mu_o cP)^{1/2}$ is used to make this calculation. Where $\mu_o$ is 4 pi×10E-7 Weber/amp-meter, c is 3×10E+8 meters/second, E is the electric field in volts, and P is power in watts. Using this relation, it is found that the voltage developed by a 150-milliwatt signal in a fourth of a micron channel is 10 volts. In an embodiment, this voltage is employed to activate a light triggered optical switch to turn on or off the switch (e.g., allow the signal light to pass through the signal channel or to block the signal light from passing through the signal channel). An example of the size change that 10 volts could cause is as follows: In a channel that is 2065 angstroms in height, 10 volts will change that size by 40 angstroms when lead zicronate titanate is used. Lead zicronate titanate has a piezoelectric strain coefficient of 3.90 times 10E-10 meters/volt. 818 nm light (8180 angstroms), commonly used for fiber optics, will be able to travel in a channel just bigger than 2045 angstroms and will not travel down a channel smaller. When the 2065 angstroms channel changes to 2014 angstroms, the signal light will be blocked. Light of 8056 angstroms wavelength or shorter could still pass through the signal channel. The light activated optical switch can be turned on or off at a rate in 10E-11 seconds or faster. It makes use of effects that the electric and magnet fields of the light have on the medium through which the light travels. The equation for the attenuation (A) of the signal inside a wave-guide, which will give the decibels of attenuation per mile of travel for the signal is as follows:

$$A=(K/a^{3/2})((1/2)(f/f_o)^{3/2}+(f/f_o)^{-1/2})/((f/f_o)^2-1)^{-1/2} \qquad \text{eq. (1)}$$

The K is a constant for the material that the walls of the channel are made of; the value of K is 821.3 for lead. Since in an embodiment, only one wall of the optical switch is mostly lead, the optical switch may not follow exactly the graph of FIG. 3, but the graph is given for illustrative purposes. The lower case "a" in the equation is the length of a side of the wave-guide. The frequency (f) of the signal being considered is in ratio against the cutoff frequency ($f_o$) in the channel. This equation is for the $TE_{0,1}$ mode of wave propagation. In an embodiment, the sizes of the waveguides are chosen so that this is the only mode possible. As this relation is studied for shrinking waveguide dimensions for a given signal, the attenuation increases as the size of the signal channel shrinks and proceeds to infinity as the cutoff frequency is reached. This equation is on page 263 of Radio Engineers' Handbook written by Frederick Terman, and published by McGraw-Hill Book Company, Inc, 1943.

Although specific embodiments of the invention have been described and illustrated, the invention is not to be limited to the specific forms or arrangements of parts as described and illustrated herein. The invention is limited only by the claims.

What is claimed is:

1. A method for operating an optical switch, the method comprising:
    applying a signal light to an optical switch that comprises a piezoelectric element, the piezoelectric element comprising at least two layers of piezoelectric material that have different piezoelectric characteristics; and
    applying an activation light to the piezoelectric element to change the state of the optical switch,
    said piezoelectric element being activated by an electrical field of said activation light, without said activation light impinging on said piezoelectric element.

2. The method of claim 1 wherein said applying the activation light to the piezoelectric element causes the shape of the piezoelectric element to change such that the signal light is not able to pass through the optical switch.

3. The method of claim 2 wherein the change in the shape of the piezoelectric element causes a change in a dimension of a signal channel of the optical switch.

4. A method for operating an optical switch, the method comprising:
    applying a signal light to an optical switch that comprises a piezoelectric element, the piezoelectric element comprising at least two layers of piezoelectric material that have different piezoelectric characteristics; and
    applying an activation light to the piezoelectric element to change the state of the optical switch,
    said applying an activation light comprising applying two light signals, which are out of phase with each other, to the piezoelectric element and then removing one of the light signals, leaving the remaining light signal as the activation light.

5. The method of claim 1 wherein the optical switch further comprises a conductive layer adjacent to the piezoelectric element that enhances said electrical field.

6. The method of claim 1 wherein two layers of the piezoelectric element have different crystal orientations.

7. An optical switch comprising:
    a signal channel configured to guide a signal light; and
    a piezoelectric element adjacent to the signal channel, the piezoelectric element comprising at least two layers of piezoelectric material that have different piezoelectric characteristics;
    wherein passage of the signal light through the signal channel is controlled by the application of an activation light to the piezoelectric element,
    said piezoelectric element being activated by an electrical field of said activation light, without said activation light impinging on said piezoelectric element.

8. The optical switch of claim 7 wherein two layers of the piezoelectric element have different crystal orientations.

9. The optical switch of claim 7 wherein two layers of the piezoelectric element have perpendicular crystal orientations.

10. The optical switch of claim 7 further comprising a conductive layer adjacent to the piezoelectric element, wherein the conductive layer enhances said electrical field.

11. The optical switch of claim 10 wherein the conductive layer is adhered to a surface of the piezoelectric element.

12. The optical switch of claim 10 wherein the conductive layer is adhered between two layers of the piezoelectric element.

13. The optical switch of claim 7 wherein said application of the activation light to the piezoelectric element causes the shape of the piezoelectric element to change such that the signal light is not able to pass through the signal channel.

14. The optical switch of claim 7 wherein the signal channel comprises a chamber that is filled with a compressible material.

15. The optical switch of claim 14 wherein the piezoelectric element forms a portion of the chamber.

16. A method for operating an optical switch, the method comprising:
    applying a signal light to a signal channel, the signal channel being adjacent to a piezoelectric element that has at least two layers of piezoelectric material that have different piezoelectric characteristics; and applying an activation light to the piezoelectric element to change the shape of the piezoelectric element such that the signal light is prevented from passing through the signal channel, said piezoelectric element being activated by an electrical field of said activation light, without said activation light impinging on said piezoelectric element.

17. The method of claim 16 wherein the optical switch further comprises a conductive layer adjacent to the piezoelectric element that enhances said electrical field.

18. An optical switch comprising:

a signal channel configured to guide a signal light;

a piezoelectric element adjacent to the signal channel, the piezoelectric element comprising at least two different layers that have different piezoelectric characteristics; and means for applying an activation light to the piezoelectric element to change the shape of the piezoelectric element such that the signal light is prevented from passing through the signal channel, said piezoelectric element being activated by an electrical field of said activation light, without said activation light impinging on said piezoelectric element.

19. The optical switch of claim 18 wherein two layers of the piezoelectric element have different crystal orientations.

20. The optical switch of claim 18 further comprising means for coupling the signal light and the activation light into the signal channel.

21. The optical switch of claim 18 wherein the means for applying an activation light comprises an activation light source.

22. The optical switch of claim 18 further comprising a conductive layer adjacent to the piezoelectric element, wherein the conductive layer enhances said electrical field.

23. The optical switch of claim 22 wherein the conductive layer is adhered to a major surface of the piezoelectric element.

\* \* \* \* \*